United States Patent [19]  
Garrett et al.

[11] 3,910,773  
[45] Oct. 7, 1975

[54] BENEFICIATION OF SALTS CRYSTALLIZED FROM SEARLES LAKE BRINE

[75] Inventors: Donald E. Garrett, Claremont; Mauritz J. Kallerud, Upland; Elie M. Chemtob, Claremont, all of Calif.

[73] Assignee: Occidental Petroleum Corporation, Los Angeles, Calif.

[22] Filed: Oct. 10, 1972

[21] Appl. No.: 295,847

Related U.S. Application Data

[62] Division of Ser. No. 25,814, April 6, 1970, abandoned.

[52] U.S. Cl. ............... 23/297; 23/298; 23/299; 23/300; 23/301; 23/302; 209/162; 209/167
[51] Int. Cl.²... B01D 9/02; C01D 3/06; C01D 3/08; C01B 35/00
[58] Field of Search ............ 23/297, 298, 299, 302, 23/301, 300, 296; 209/166, 167, 165, 162

[56] References Cited
UNITED STATES PATENTS

| | | | |
|---|---|---|---|
| 1,496,152 | 6/1924 | Dolbear | 23/297 |
| 1,594,707 | 8/1926 | Binder | 23/297 |
| 1,673,969 | 6/1928 | Dolbear | 23/297 |
| 1,712,787 | 5/1929 | Burke | 23/298 |
| 1,853,275 | 4/1932 | Houghton | 23/298 |
| 1,921,481 | 8/1933 | Ritchie | 23/298 |
| 1,936,070 | 11/1933 | Ritchie | 23/297 |
| 2,738,254 | 3/1956 | Suhr | 23/298 |
| 3,451,788 | 6/1969 | Smith | 23/299 |
| 3,525,434 | 8/1970 | Garrett | 209/166 |
| 3,675,773 | 7/1972 | Chemtob | 209/166 |

Primary Examiner—Jack Sofer
Assistant Examiner—S. J. Emery
Attorney, Agent, or Firm—Christie, Parker & Hale

[57] ABSTRACT

Solar evaporation is used to selectively crystallize readily processable sodium and potassium salt groupings from a complex brine, such as Searles Lake brine. The harvested salt groupings are then separated by steps which include flotation, and fractional leaching and crystallization.

7 Claims, 1 Drawing Figure

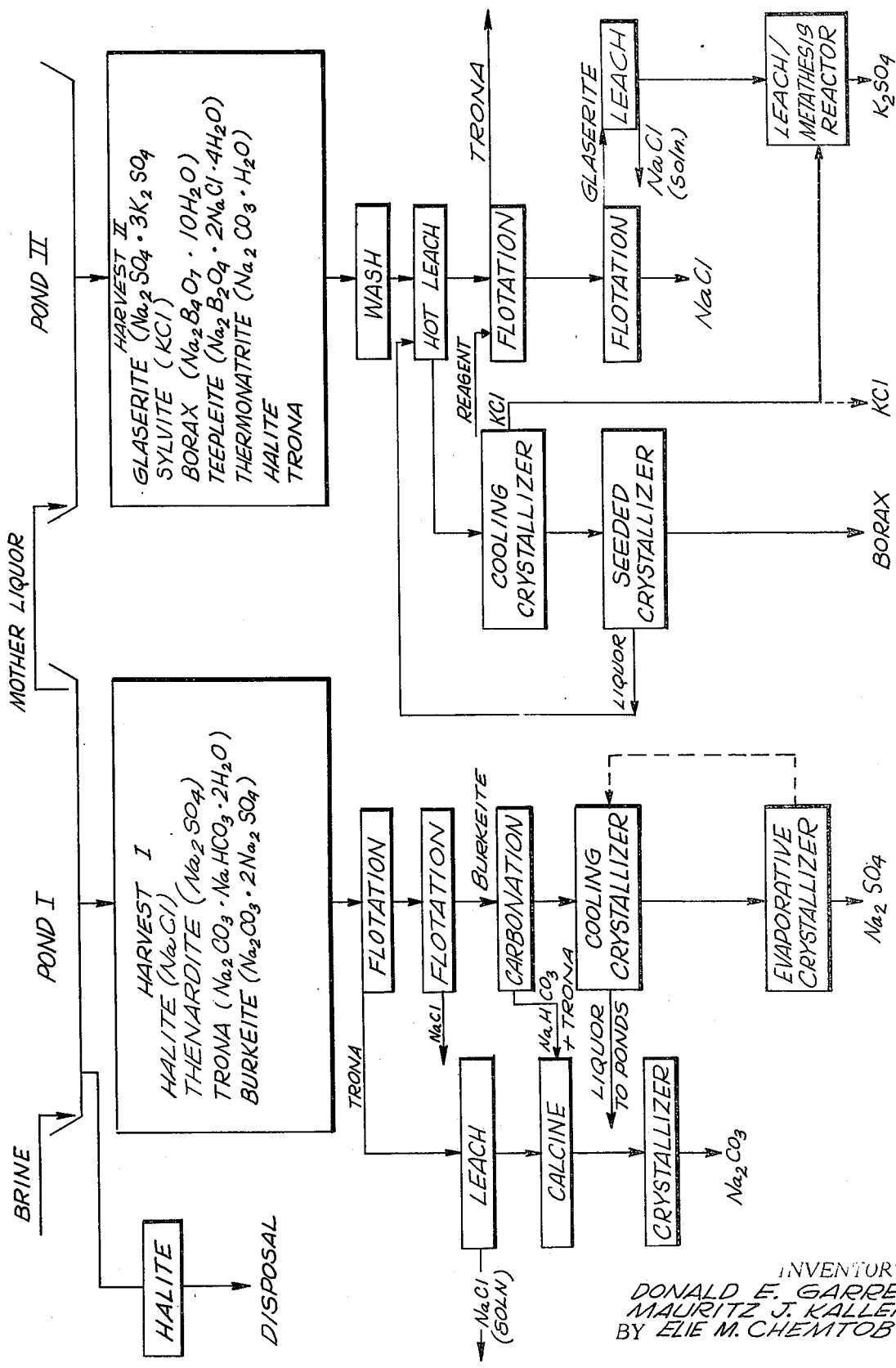

BENEFICIATION OF SALTS CRYSTALLIZED FROM SEARLES LAKE BRINE

CROSS REFERENCE TO RELATED APPLICATIONS

This is a division of application Ser. No. 25,814, now abandoned, filed Apr. 6, 1970.

BACKGROUND OF THE INVENTION

Complex salt brines as found in saline mineral bodies, such as Searles Lake, or formed in dissolving saline mineral body salts are most difficult to separate into their salable components. Most existing processes are only adaptable for separating portions of the contained salt efficiently and usually result in the loss of what would otherwise be considered valuable products. One process, for instance, involves the carbonation of brine to precipitate the carbonate values as trona and/or sodium bicarbonate, then cooling the residual liquor to cause the crystallization of Glauber's salt, and the metastable crystallization of borax from the cooled brine. Alternately, a mixture of crystals could be obtained, by cooling, and separated by particle size differential.

In this process all of the potash values and minor constituents, and part of the salt cake, soda ash, and borax, are lost.

With costs of processing saline mineral bodies increasing, it is evident it is becoming important to maximize the amount of salt values recovered in any one process.

Process economics have focused fresh attention on the use of solar evaporative techniques to harvest salts. While solar evaporation has long been considered a possible route to obtaining salt values from a brine, the salts obtained are often as complex, and sometimes more so, than the salts in the original brine and no real advantage results from this step.

SUMMARY OF THE INVENTION

It has now been found that readily processable salt groupings may be selectively crystallized out of complex salt brines containing several or all of the ions, sodium, potassium, chloride, sulfate, carbonate and borate, such as Searles Lake brine, by concentrating the brine in at least one solar evaporator to crystallize a group of readily processable sodium salts substantially free of potassium salt values, then further concentrating the resultant mother liquor in one or more solar evaporators to crystallize out a group of salts rich in potassium and borax values.

By this process, the initial solar evaporator or series of evaporators may be used to contain sodium salts, and the following solar evaporator or series of evaporators utilized to contain and yield the bulk of the salts of highest value for sale or further processing.

The recovery of potassium and other values may be further enhanced by solar evaporation in two stages in which the mother liquor is first concentrated to yield a grouping of salts rich in glaserite and then concentrated in another solar evaporator to crystallize a grouping of salts rich in sylvite and borax. The valuable salt groupings formed in each of the solar evaporations are simple and readily processable into salable products using low cost processing techniques.

In addition, selective group crystallization using solar evaporation allows a total harvesting of all salts contained in a complex brine in a preferred form for processing. Flotation steps are often of key value for plant separations as assisted by fractional crystallization and/or leaching.

DRAWING

The drawing is a flow diagram which illustrates a preferred process of this invention.

DESCRIPTION

According to the present invention, sequential solar evaporations are used to crystallize readily processable salt groupings from a complex brine, such as Searles Lake brine. This is achieved by passing the brine through a series of ponds in a sequence where the residence time in any one pond is adjusted so that only certain groupings of salts crystallize. This partial crystallization fractionates the mineral content of the brine into groupings readily processable for recovery of salable salt values.

The first step of the process involves the deposition of a sodium salt grouping substantially free of potassium salts. With reference to the drawing, the sodium salt groupings obtained in the first solar evaporative crystallization are essentially some or all of the minerals, halite ($NaCl$), thenardite ($Na_2SO_4$), burkeite ($Na_2CO_3 \cdot 2Na_2SO_4$), and/or trona ($Na_2CO_3 \cdot NaHCO_3 \cdot 2H_2O$), the major component being halite.

In some instances some or all of the salts in this initial grouping may have little value and can be discarded. When, however, the group is processed for its sodium values, sodium carbonate may be recovered by carbonation after leaching of the salts, typically following the flotation of trona from the harvested salts. The balance of the sodium salt values may then be processed under a variety of conditions to yield salts of maximum market value.

As shown in the drawing, a convenient system involves the flotation to separate trona, which may, in turn, be leached, calcinated and recrystallized to yield sodium carbonate as a salt value. The remaining sodium salts may then be dissolved and carbonated to recover the carbonate values as trona and/or sodium bicarbonate and ultimately soda ash. The brine may then be passed through a cooling-crystallization and dewatering operations to recover Glauber's salt or mirabilite ($Na_2SO_4 \cdot 10H_2O$) which can be further processed in an evaporative or salting-out crystallizer to form sodium sulfate as a salt value. The waters and liquors freed during the operation may be used for washing operations, returned for recycle to the pond or discarded as waste since the sodium valves contained therein will be primarily sodium chloride, which may have little, if any, market value. The sequence of cooling to produce Glauber's salt before carbonation may also be practiced if desired.

Alternately, instead of dissolving the salts before carbonation, burkeite may be separated by flotation, with reagents such as sulfonates and then processed to soda ash and/or salt cake by a combination of steps which would involve alternates of leaching, dissolving, carbonation, and cooling, as described in the preceding paragraph. Burkeite is floated using reagents such as sulfonates.

The first step of the process also lends itself to initial brine treatment prior to solar evaporation to control the nature of the sodium salts deposited prior to deposition of potassium salts. For instance, a carbonation step may be employed prior to the introduction of the brine to the first solar evaporator to recover soda ash first, and thus reduce or eliminate the formation of trona and burkeite. Likewise, during the colder months mirabilite may be crystallized directly as part of the sodium salt harvest without deposition of potassium salts or the brine may be cooled in plant equipment to produce Glauber's salt and hence, salt cake directly and eliminate or reduce the need for recovering it from the harvested salts.

This alternate procedure could use two ponds for harvesting the sodium salts. In this instance halite crystallization occurs sufficiently ahead of other salts so that deposition of sodium chloride alone occurs in an initial pond. A harvest of sodium chloride, burkeite and trona, or thenardite, is then obtained in the second sodium salt solar recovery pond. The sodium salts may then be processed in the manner described above for the single pond embodiment. However, as much of the recoverable sodium chloride was deposited in an initial pond, the harvesting and processing costs will be minimized.

The solar evaporative ponds are preferably operated, according to this invention, at ambient temperatures without added heating or cooling. Accordingly, the residence time of the brine in the first pond will vary depending on the time of the year. Generally, when the pond solids are determined by analysis to display the desired content of potassium salts, the liquor should be removed to a second solar evaporation pond where the recovery of potassium valves is initiated.

As indicated, one or more solar evaporations are used for the recovery of potassium values. Cold weather conditions favor the formation of mirabilite and its direct crystallization in the first pond may result in its removal as part of the sodium salt harvest. This would deplete the brine of some of its sulfate ions and more potassium values would appear as sylvite (KCl).

Generally, unless there has been major sulfate removal by cooling, much of the potassium values appear as glaserite, and if desired, two solar evaporate ponds may be employed, one for the selective crystallization of a salt harvest rich in glaserite, followed by selective crystallization of a salt harvest rich in sylvite in a subsequent pond.

When recovery of potassium values as glaserite and sylvite in two solar evaporative ponds is desired, the first pond is operated under conditions which favor the deposition of glaserite along with its companion salts, halite and minor amounts of burkeite, salt cake, borax ($Na_2B_4O_7 \cdot 10H_2O$), trona, and/or thermonatrite. Evaporation is allowed to continue in this pond until sylvite begins to crystallize which indicates the liquor is ready for removal to the next solar evaporation pond where a salt harvest rich in sylvite, borax and thermonatrite is obtained.

Alternately and preferably, as shown in the drawing, all of the potassium values along with companion salts are recovered as a single harvest by allowing the potassium-rich brine to evaporate to dryness.

As shown in the drawing, the harvest from the second solar evaporative pond is readily separable into salable components using a combination of washing, flotation, leaching and crystallization steps. After an optional washing of the glaserite-rich harvest to remove bittens, the salt harvest is passed to a first hot leach step where sylvite and borax are removed. Glaserite is then froth floated, using as flotation aids saturated or unsaturated fatty acids and their salts, sulfonated hydrocarbons, such as α-eicosene, and hydrocarbon sulfates, such as sulfosuccinate and the like. The sodium chloride is preferably leached from the floated product in a countercurrent manner with end liquor, yielding a good purity glaserite as an end product. The hot leach solution rich in borax and potassium chloride, as shown, may be passed to a potassium chloride cooling-crystallizer and then a seeded borax crystallizer for recovery of pure potassium chloride and borax, respectively.

The balance of the second harvest principally contains sodium chloride and trona. Trona is preferably floated from this salt grouping, using reagents such as cresylic acid. The sodium chloride values in the residue may then be returned, if desired, to the Glauber's salt converter used for the salting out of salt cake from brine obtained from the first harvest.

Trona flotation can alternately be performed after the hot leach, but before the glaserite flotation, or either or both of these flotations performed independent of the hot leach. The choice between these process alternates is based on the economic advantages of the desired products which are to be recovered from the process.

When two solar ponds are used to harvest potassium salts, the salts in the second pond will be rich in sylvite and its accompanying salts, halite, some glaserite, thermonatrite ($Na_2CO_3 \cdot H_2O$) and borax in the form of decahydrate and/or teepleite ($Na_2B_2O_4 \cdot 2NaCl \cdot 4H_2O$). After washing to remove bitterns this harvest lends itself to treatment in the manner described above. Alternately, glaserite, borax, sylvite may all be floated. The float which is more typically potassium chloride and sodium chloride, is subjected to a leach to extract sodium chloride which is returned to the sodium salt harvest processing system, leaving potassium chloride as the sole residue product, which may be recovered as such or used, to the extent desired, to convert to glaserite recovered in the second harvest to potassium sulfate, by, for example, the metathesis reaction as set forth in U.S Pat. No. 1,936,070 to Ritchie, et al.

Using the selective solar evaporation techniques, according to the practice of the invention, allows complete harvesting of all salt values in a complex brine, such as Searles Lake brine. As evidenced from the accompanying drawing, each harvest is readily processed for recovery of the salable components using low cost operating techniques and completely avoids the formation of salt complexes difficult to process or the formation of salt groupings which have little or no commercial value.

In the processing of Searles Lake brine in particular, the following salt groups are normally obtained in the operation of the solar evaporative process of this invention. The salts are shown in the harvest in the order of deposition.

WARM SEASON

MEDIUM SULFATE BRINE

HARVEST I

Halite+trona
Halite+trona+burkeite
Halite+burkeite

HARVEST II

Halite+burkeite+glaserite+borax
Halite+glaserite+borax+trona (secondary formation)
Halite+glaserite+borax+trona+thermonatrite
Halie+glaserite+sylvite+borax+teepleite+thermonatrite+trona If two solar evaporative ponds are used to recover potassium values, the final grouping of salts in Harvest II is deposited in the last potassium pond.

WARM SEASON

LOW SULFATE BRINE

HARVEST I

Trona
Halite+trona
Halite+trona+burkeite

HARVEST II

Halite+burkeite+glaserite+borax
Halite+glaserite+borax+trona
Halite+glaserite+borax+trona+thermonatrite
Halite+glaserite+sylvite+borax+teepleite+thermonatrite+trona Again, when two ponds are employed for potassium salt recovery, the final two groups of salts will be deposited in the second pond.

In the winter season, mirabilite is obtained by cooling in the high sulfate brines before or from various stages of evaporation. In the concentrated brines, natron ($Na_2CO_3 \cdot 10H_2O$) takes the place of thermonatrite. In very high $HCO_3$ brine, cold weather promotes a deposition of mirabilite+ahcolite ($NaHCO_3$). When this occurs very little glaserite will be formed during solar evaporation to recover a harvest of potassium salts.

While the invention has been described in terms of recovery of salt values from grouping of salts obtained by solar evaporation, it is within the ambit of this invention to apply many or all of the operating procedures to any naturally occuring or industrially formed grouping of salts.

What is claimed is:

1. A process for treating a grouping of crystalline salts from the crystallization of a Searles Lake Brine containing the ions sodium, potassium, chloride, sulfate, carbonate and borate which comprises:
    a. leaching sylvite and borax from the crystalline salt grouping comprising sylvite, glaserite, borax, trona, teepleite, thermonatrite and halite using a hot leach solution;
    b. cooling the hot leach liquor to crystallize sylvite and form a liquor rich in borax;
    c. seeding the liquor rich in borax with borax to crystallize borax and form a residual liquor; and
    d. reheating at least part of the residual liquor form borax crystallization to leach additional sylvite and borax from the crystalline salt grouping;
    e. beneficiating the residual salts of the crystalline grouping to obtain a float containing predominately trona, using as the beneficiating reagent cresylic acid;
    f. beneficiating the residual salts from step (e) to obtain a float containing predominately glaserite using as the flotation reagent a compound selected from the group consisting of saturated fatty acids, unsaturated fatty acids, salts of saturated fatty acids, salts of unsaturated fatty acids, sulfonated hydrocarbons, hydrocarbon sulfates and mixtures thereof, and
    g. converting the glaserite to potassium sulfate by reaction with sylvite.

2. A process as claimed in claim 1 in which the glaserite obtained in the last float is leached to remove at least halite and the leached glaserite is converted to potassium sulfate by a metathesis reaction with sylvite.

3. A process as claimed in claim 1 in which the glaserite obtained in the float is leached to remove at least halite and the leached glaserite is converted to potassium sulfate by a leach reaction with sylvite.

4. A process as claimed in claim 1 which includes the steps of:
    a. beneficiating the residual salts to obtain a float containing predominantly burkeite; and
    b. dissolving the burkeite to form a solution containing sodium carbonate and sodium sulfate.

5. A process as claimed in claim 4 in which the sodium carbonate-sodium sulfate solution is cooled to recover salt cake.

6. A process as claimed in claim 4 in which the sodium carbonate-sodium sulfate solution is carbonated to form soda ash.

7. A process for treating a grouping of crystalline salts from the crystallization of a Searles Lake Brine containing the ions sodium, potassium, chloride, sulfate, carbonate and borate which comprises:
    a. leaching sylvite and borax from the crystalline salt grouping comprising sylvite, glaserite, borax, trona, teepleite, thermonatrite and halite using a hot leach solution;
    b. cooling the hot leach liquor to crystallize sylvite and form a liquor rich in borax;
    c. seeding the liquor rich in borax with borax to crystallize borax and form a residual liquor; and
    d. reheating at least part of the residual liquor from borax crystallization to leach additional sylvite and borax from the crystalline salt grouping;
    e. beneficiating the residual salts of the crystalline grouping to obtain a float containing predominately glaserite using as the flotation reagent a compound selected from the group consisting of saturated fatty acids, unsaturated fatty acids, salts of saturated fatty acids, salts of unsaturated fatty acids, sulfonated hydrocarbons, hydrocarbon sulfates and mixtures thereof;
    f. converting the glaserite to potassium sulfate by reaction with sylvite, and
    g. beneficiating the residual salts from step (e) to obtain a float containing predominately trona, using as the beneficiating reagent cresylic acid.

* * * * *

UNITED STATES PATENT AND TRADEMARK OFFICE
CERTIFICATE OF CORRECTION

PATENT NO. : 3,910,773
DATED : October 7, 1975
INVENTOR(S) : Donald E. Garrett, Mauritz J. Kallerud, Elie M. Chemtob It is certified that error appears in the above-identified patent and that said Letters Patent are hereby corrected as shown below:

Column 2, line 52, "valves" should read --values--.

Column 3, line 32, "valves" should read --values--.

Column 3, line 42, "evaporate" should read --evaporative--.

Column 3, line 67, "bittens" should read --bitterns--.

Column 5, line 35, "ahcolite" should read --nahcolite--.

Signed and Sealed this twenty-third Day of March 1976

[SEAL]

Attest:

RUTH C. MASON
Attesting Officer

C. MARSHALL DANN
Commissioner of Patents and Trademarks